United States Patent [19]

Kazlauskas

[11] Patent Number: 4,554,429
[45] Date of Patent: Nov. 19, 1985

[54] CYLINDRICAL TUBE WELDING ASSEMBLY

[76] Inventor: Gasparas Kazlauskas, 10219 Briarwood Dr., Los Angeles, Calif. 90024

[21] Appl. No.: 529,091

[22] Filed: Sep. 2, 1983

[51] Int. Cl.[4] ............................................. B23K 9/225
[52] U.S. Cl. ................................. 219/60.2; 219/60 A; 219/125.11
[58] Field of Search ............... 219/60.2, 125.11, 60 R, 219/60 A, 61

[56] References Cited

U.S. PATENT DOCUMENTS 3,754,115 8/1973 Roberts et al. ...................... 219/60.2

Primary Examiner—C. L. Albritton
Assistant Examiner—Alfred S. Keve
Attorney, Agent, or Firm—Jack C. Munro

[57] ABSTRACT

The welding head assembly for welding together a pair of cylindrical tubes wherein one of the tubes protrude along with a mass of other similar tubes from a tube sheet. To precisely locate the welding head position at an exact position for each and every produced weld there is utilized a locator plate assembly which is to be fixedly mounted a precise distance from the tube sheet directly on to the tube which protrudes from the tube sheet. The locator plate assembly includes a position locator mechanism which connects with the face of the tube sheet to precisely locate the locator plate assembly a precise distance from the tube sheet. A location gage assembly is to connect with the locator plate assembly to initially establish the desired position for the locator plate assembly. Upon removal of the location gage assembly from the locator plate assembly, a welding head is to be engaged with the locator plate assembly.

19 Claims, 19 Drawing Figures

CYLINDRICAL TUBE WELDING ASSEMBLY

BACKGROUND OF THE INVENTION

The field of this invention relates to automatic welding apparatuses and more particularly to a welding assembly, which is designed primarily to facilitate welding of a pair of tubes, one of which protrudes from a tube sheet.

A heat exchanger typically consists of a shell in which are located a large number of parallel tubes through which a liquid is conducted. Steam is caused to flow into the shell, heating the tube, and therefore, heating the liquid that is in the tube. At both ends of the heat exchanger the tubes are held in their fixed position by the tube sheet. These spaced apart tubes sheets separate the steam containing shell interior from the remaining portion of the heat exchanger.

In a typical heat exchanger, there may be literally hundreds (in number) of tubes mounted in a closely spaced arrangement within the tube sheet. One tube from the tube sheet is normally connectd through a U-shaped connecting conduit to a directly adjacent tube. This connecting procedure is repeated for the mass of tubes extending from the tube sheet. It is necessary to insure that each joint connecting the connecting conduit to each tube is leakless. It has been found in the past that the best procedure to insure a leakless joint is by welding.

It has been found that manual welding of each of the tubes produces an insufficient quality weld. The inherently repetitive creating of each annular weld results in an occasional poor quality weld. Even if a single tube is found to leak, that leak must be repaired. Therefore, some means must be utilized to achieve a 100% weld quality at every weld.

In order to achieve this 100% weld quality, it is common to use an automatic welding apparatus. The automatic welding apparatus is securable in a set position with respect to the welding area. Desirable weld quality is obtained through the use of an inert gas environment to the tio of the welding electrode. The welding electrode and voltage is monitored by the use of a computer and instantaneous changes will be made if preset desirable parameters are not met during the welding procedure.

It is desirable for some means to be utilized to facilitate mounting of the welding head assembly in exactly the correct position with each pair of tubes that is to be welded. Upon welding of a particular pair of tubes, it is desirable to move as quickly and as easily as possible the welding head to a different pair of tubes and precisely locate such so that the weld with the next pair of tubes can now be accomplished. The structure of the present invention is designed in particular to produce repetitive welding of tubes which are precisely located in respect to a tube sheet.

SUMMARY OF THE INVENTION

A welding head assembly for welding a pair of cylindrical tubes with one tube protruding from a tube sheet. A locator plate assembly is to be fixedly mounted on the tube protuding from the tube sheet. Prior to fixing of the locator plate assembly, the position of such is determined by a location gage which is removably attached to the locator plate assembly. The location gage assembly includes a protruding flange which is to be alignable with the open end of the tube protruding from the tube sheet to precisely determine the position at which the locator plate assembly is to be fixed. The locator plate assembly also includes a position locater mechanism which is to be moved into contact with the tube sheet. Upon movement of the locator plate assembly to a different cylindrical tube the position locator mechanism facilitates quick, precise location of the locator plate assembly. The welding head is to be connected to the locator plate assembly through a movable bifurcated hook assembly. The welding head assembly includes a pair of members which are movable in a clam shell relationship about the welding area to form an enclosed annular space about the weld area. The welding electrode is supported within a driven gear within the welding head. The driven gear is rotatively driven by a motor through a driving gear assembly. Mounted on the periphery of the driven gear is a protuberance. This protuberance is to connect with a switch assembly mounted within the welding head which is to stop the movement of the driven gear at a precise position each and every time movement of the driven gear is terminated.

DETAILED DESCRIPTION OF THE SHOWN EMBODIMENT

Figure 1:
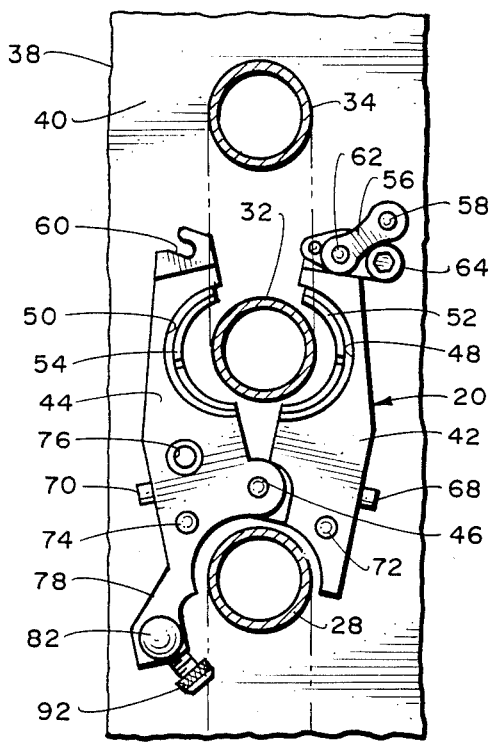
FIG. 1 is a cross-sectional view through a plurality of tubes protruding from a tube sheet showing a locator plate assembly included within this invention an open position about to be installed upon one of the tubes.

Referring particularly to the drawings there is generally shown a locator plate assembly 20, location gage assembly 22 and the welding head assembly 24. Locator plate assembly 20, locator gage assembly 22 and the welding head assembly 24 are to be utilized in combination to weld tubes 26 and 28 to a connecting conduit 30. Similarly tubes 32 and 34 are to be welded to a connecting conduit 36.

Each of the tubes 26, 28, 32 and 34 are fixedly mounted within a tube sheet 38. Tube sheet 38 comprises a metal sheet which includes a mass of circular shaped openings formed therein. The openings are normally equidistantly located in respect to each other in horizontal rows and vertical columns. Each of the tubes 26, 28, 32 and 34 are to be snugly located within a respective opening and extend the same distance from the front face 40 of the tube sheet 38.

The locator plate assembly 20 is constructed of a pair of members 42 and 44 which are hinged together about the hinge pin 46. The member 42 includes a semicircular recess 48. A similar recess 50 is included in member 44.

Fixedly mounted within the recess 48 is a semicircular cup 52. A similar cup 54 is mounted within the recess 50. The members 42 and 44 are to move between an open position as shown in FIG. 1 of the drawings to a closed position shown in FIG. 2 of the drawings. In the open position a tube such as tube 32 can be located between the cups 52 and 54 and then the members 42 and 44 are moved to the closed position. The cups 52 and 54 are to be in snug contact with the exterior surface of the tube 32. It is the function of the cups 52 and 54 to slightly deflect as the members 42 and 44 are pulled together about the tube 32. This slight deflection further insures secure connection between the members 42 and 44 and the tube on which it is mounted. In order to maintain this tight connection, an over-center locking mechanism is employed in the form of a link 56. The link 56 includes an outer pin 58 which is to fall within recess 60 formed within the member 44. Link 56 also includes an inner pin 62 upon which is mounted bar 64. Bar 64 is to function as a handle which is to be moved slightly over-center as shown in dotted lines within FIG. 2 of the drawings. The so doing of this movement tightly pulls together the members 42 and 44 about the tube 32. It is to be noted that the bar 64 may also include Allen screw opening 66 to be utilized in conjunction with a separate Allen wrench (not shown) when the locator plate assembly 20 is heated. This heating of the locator plate assembly 20 would be quite common during the welding procedure.

On the side of the member 42 there protrudes a pin 68. A similar pin 70 protrudes from the side of the member 44. Protruding from the front face of the member 42 is an aligning pin 72. A similar aligning pin 74 protrudes from the front face of the member 44. Also formed within the member 44 is a threaded opening 76.

Inwardly attached to the member 44 and extending therefrom is an extension 78. The extension 78 has a hole 80 formed therein. A rod housing 82 is fixedly mounted with the hole 80. A rod 84 is slidably mounted within the rod housing 82. Also located within the rod housing 82 is a coil spring 86 which exerts a continuous bias against the rod 84 tending to push the tip 88 of the rod 84 into tight physical contact with the front face 40 of the tube sheet 38. The rod 84 also includes an inclined cut-out 90. Threaded bolt 92 is threadedly connected through an opening in the housing 82 and connects with the cut-out 90. Function of the rod 84 and its associated structure will be described further on in this specification.

The location gage assembly 22 includes a housing 94. Within the back face of the housing 94 there is included a hole 96. Alignment pin 74 is to be locatable within the hole 96.

Figure 3:
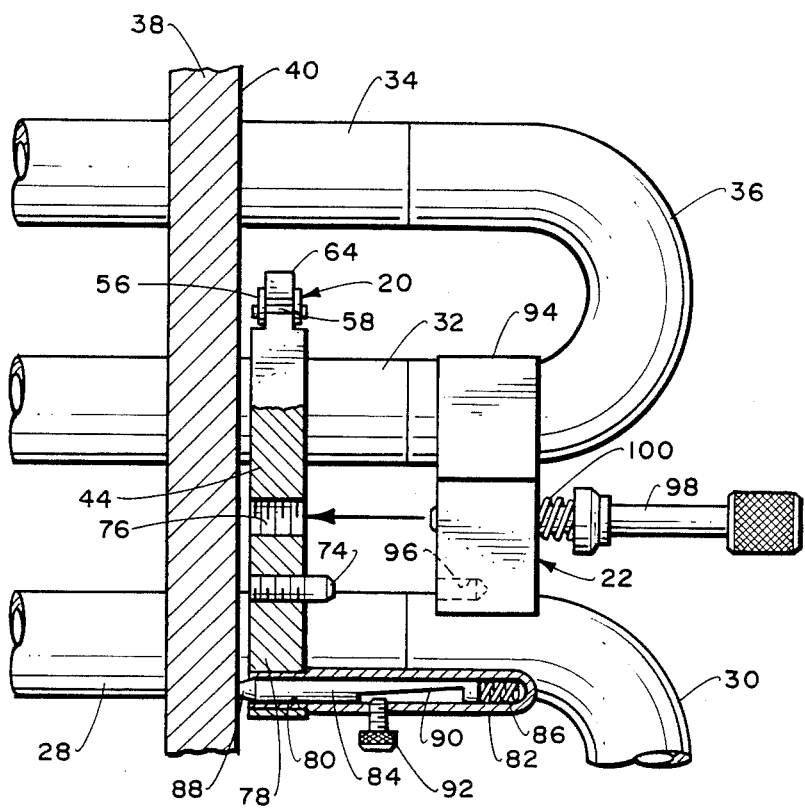
FIG. 3 is a side cross-sectional view through the locator plate assembly taken along line 3—3 of FIG. 2 showing a location gage assembly in a position about to be connected to the locator plate assembly.
Figure 4:
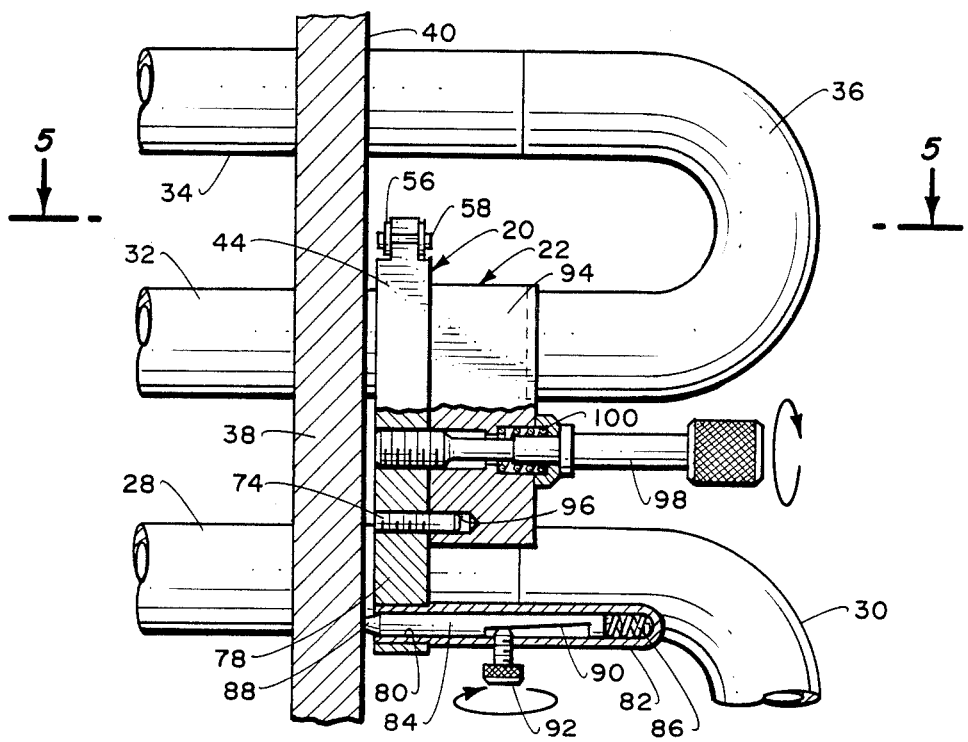
FIG. 4 is a view similar to FIG. 3, but showing the location gage assembly in the fully installed position with the locator plate assembly.
Figure 5:
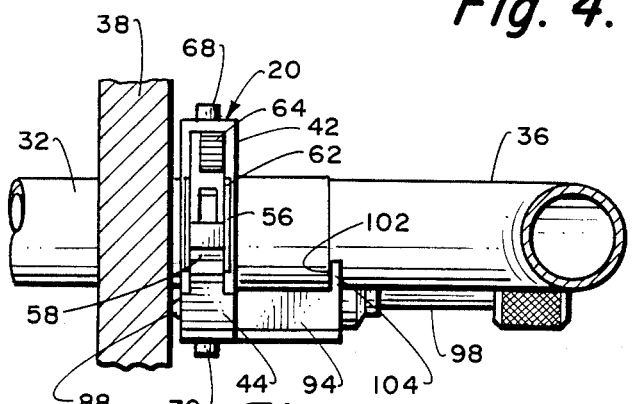
FIG. 5 is a top plan view, partly in cross-section, of the locator plate assembly and its attached location gage assembly taken along line 5—5 of FIG. 4.
Figure 6:
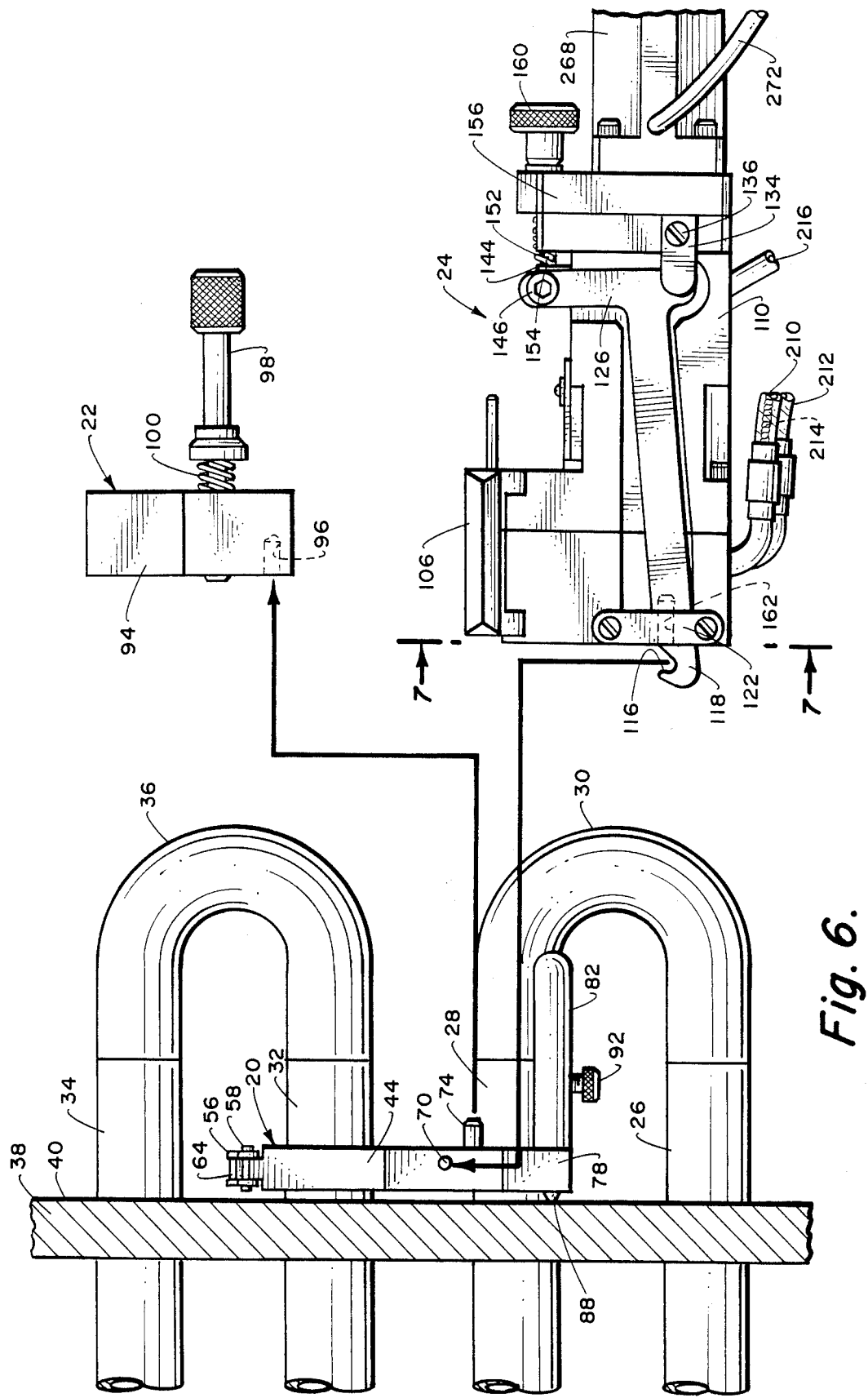
FIG. 6 is a side, elevational view similar to FIG. 4 depicting the removing of the location gage assembly and the installing of the welding head assembly on the locator plate assembly.

Also connected with the housing 94 and extending from the front surface of the housing 94 and out through the rear surface thereof is threaded rod 98. Threaded rod 98 is spring biased by a coil spring 100 to a retracted position shown in FIGS. 3 and 6 of the drawings. The inner threaded end of the rod 98 is to threadably engage with threaded opening 76 and when tightened causes compression of the coil spring 100. In this particular tightened position the housing 94 is in tight connection with the locator plate assembly 20.

The location gage assembly 22 is tightly secured to the locator plate assembly 20 by tightening of the rod 98. The operator then moves bar 64 so that pin 58 disengages from recess 60 permitting the members 42 and 44 to be pivoted about pivot pin 46 to the open position as shown in FIG. 1 of the drawings. The operator then places the particular tube such as tube 32 in between the cups 52 and 54. The operator then moves the members 42 and 44 to the substantially closed position and then locates the pin 58 within the recess 60. The operator then proceeds to locate alignment surface 102, which is formed by flange 104 which is integral with the housing 94, in alignment with the open end of the tube 32 (in other words, abutting the end 32). It is to be understood that this abutting of the end of the tube 32 is prior to positioning of the connecting conduit 36 at the position to be welded. If the connecting conduit 36 is already in place, the operator will then merely align the aligning surface 102 with the open end of the tube 32.

Figure 2:
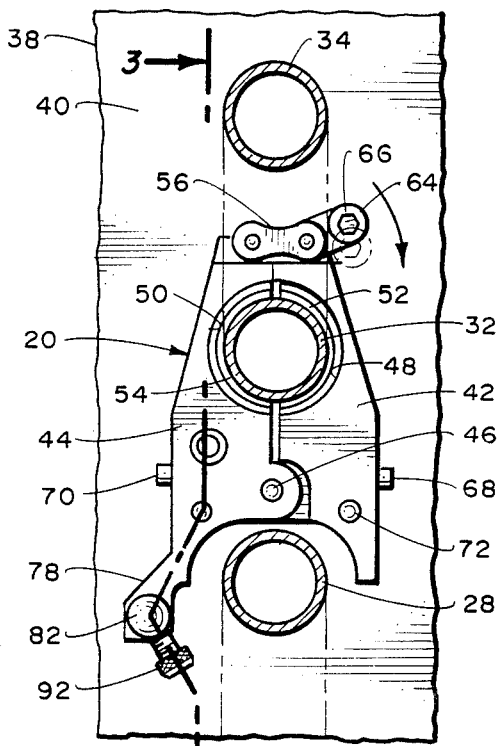
FIG. 2 is a view similar to FIG. 1, but showing the locator plate assembly in a closed position fixed to one of the tubes.

The operator then proceeds to move bar 64 to the over-center position shown in the dotted line position in FIG. 2 of the drawings. The locator plate assembly 20 is now tightly secured onto the tube 32. Also due to the action of the spring 86, the tip 88 of the rod 84 is located in tight contact with the front face 40 of the tube sheet 38. The operator then proceeds to tighten the bolt 92 against the cut-out 90. Because of the inclined surface of the cut-out 90, the bolt 92 will prevent any movement of rod 84 in a direction to further compress the spring 86.

At this particular time the location gage assembly 22 is now removed from the locator plate assembly 20 and will normally not be used in conjunction with welding of any of the remaining tubes of this particular tube sheet 38. Let it be assumed that the operator has now performed the weld between the tube 32 and the connecting conduit 36. Now let it further be assumed that the operator wishes to move the locator plate assembly to tube 34. The operator manually moves bar 64 so that the pin 58 disengages from the recess 60 permitting movement of members 42 and 44 to the open position. The locator plate assembly 20 can now be disengaged from the tube 32 and relocated about the tube 34. During this relocation, the rod 84 will be moved in a protruding manner due to the bias of the spring 86.

After relocation of the members 42 and 44 about the tube 34 and an initial re-engagement of the pin 58 within the recess 60, the operator merely moves the locator plate assembly 20 towards the front face 40 until the rod 84 is prevented from further inward movement (towards spring 86) due to the location of the bolt 92. The operator then knows that the locator plate assembly 20 is in the correct position and then moves the bar 64 to the over-center position tightly mounting the locator plate assembly onto the tube 34. Again, it is to be kept in mind that the end of the tube 34 protrudes exactly the same distance from the front face 40 of the tube sheet 38 as the tube 32. Therefore, with the tip 88 in tight contact with the front face 40 and the rod 84 being prevented from further inward movement by the bolt 92, the operator then knows that the the locator plate assembly 20 is mounted the same distance from the front face 40 as the locator plate assembly 20 was mounted on the tube 32.

Figure 7:
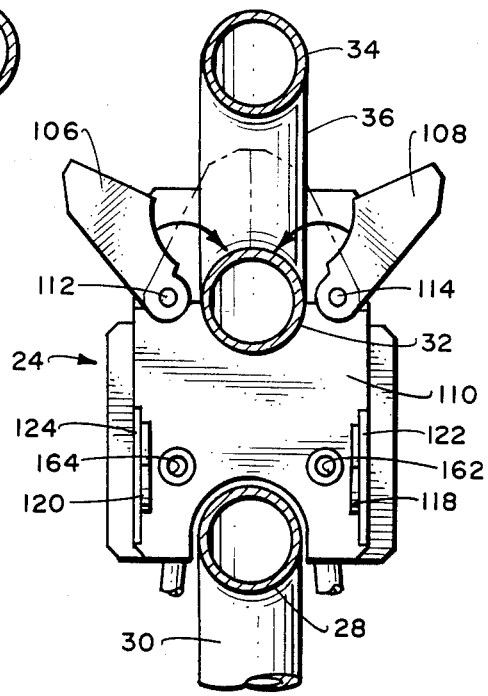
FIG. 7 is an end view of the welding head assembly included within this invention taken along line 7—7 of FIG. 6 showing in detail the clam shell members which are to be utilized to clamp around the welding area of the cylindrical tubes which are to be welded.

With the locator plate assembly 20 so mounted, it is now desirable to connect the welding head housing 24 to the locator plate assembly 20. The operator first moves clam shell members 106 and 108 to the open position as shown in the solid line position in FIG. 7 of the drawings in relation to welding head housing 110. Clam shell members 106 and 108 are pivotally mounted by their respective pivot pins 112 and 114 onto the housing 110. It is to be noted that the housing 110 is composed of two separate parts which are secured together. For purposes of description of this invention it is only necessary to describe the housing 110 as a single unit.

To connect the locator plate assembly 20 to the welding head assembly 24, the operator locates pin 70 within recess 116 formed in the outer free end of elongated hook member 118. Similarly the pin 68 is to connect with the recess (not shown) formed within the outer free end of elongated hook member 120. The hook members 118 and 120 are considered part of a bifurcated hook assembly.

The outer end of the hook 118 is held in position against the housing 110 by plate 122. Similarly, the outer end of the elongated hook 120 is held against the housing 110 by means of plate 124. The inner end of the arm 118 is inwardly secured to a first connecting arm 126. Similarly, the inner end of the hook member 120 is inwardly connected to the second connecting arm 128. The lower end of the arm 126 is secured to a pivot pin 130. Pin 130 supported by a first bearing assembly 132 supported within the housing 110. The exterior surface of the pin 130 is covered by means of a plate 134 which is also fixed to the housing 110 by means of fastener 136.

Similarly, the lower end of the second connecting arm 128 is secured to a pivot pin 138 which is in turn supported by a second bearing assembly 140 mounted within the housing 110. The exterior surface of the pin 138 is covered by means of a plate 142 which is in turn fastened to the housing 110 by means of a fastener (not shown).

The upper end of the arm 126 is fixedly secured by means of fastener 146 to an apex arm 144. Similarly, the upper end of the second connecting arm 128 is fixedly secured by fastener 148 to the apex arm 144. Centrally located within the apex arm 144 is a threaded opening 150. The threaded opening 150 connects with threaded rod 152.

Located about the threaded rod 152 is a coil spring 154. Spring 154 is located between the apex arm 144 and motor mounting plate 156. The rod 152 extends through opening 158 formed within the motor mounting plate 156. The outer end of the rod 152 is fixedly secured to a know 160. Manual turning of the knob 160 causes the first and second connecting arms 126 and 128 to move the inclined vertical position shown within FIG. 6 to the substantially vertical position shown in FIG. 8. When in the inclined vertical position shown within FIG. 6, the pins 68 and 70 are disconnected from their respective recesses (only 116 being shown). Therefore, the welding head assembly 24 can be disconnected from the locator plate assembly 20. Upon the first and second connecting arms 126 and 128 being located in the vertical position, the pins 68 and 70 connect with their respective recesses, such as recess 116, which securely fastens the welding head assembly 24 to the locator plate assembly 20. With the welding head assembly 24 so located, the alignment pin 74 is located within the hole 162 formed within the housing 110 and the alignment pin 72 is located within the hole 164 also formed within the housing 110.

It is desirable when the clam shell members 106 and 108 are in the closed position that they are maintained in that position and not permitted to freely move to the open position. In order to achieve this result, there is included a detent mechanism in conjunction with each member 106 and 108. The detent mechanism for member 106 comprises a ball 166 which is biased by a spring 168 in contact with a recess 170 formed within the lower edge of the member 106. The spring 168 fits within an appropriate hole 172 formed within the housing 110. Similarly, a spring 174 is located within a hole 176 formed within the housing 110. The spring 174 contacts a ball 178. The ball 178 connects with recess 180 when the clam shell member is in the closed position.

Figure 9:
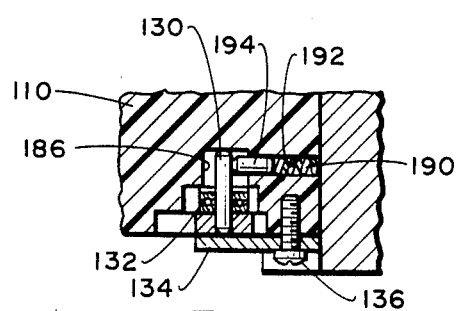
FIG. 9 is a cross-sectional view through a portion of a bifurcated hook assembly, taken along line 9—9 of FIG. 8, which is utilized to connect a welding head assembly to the locator plate assembly.
Figure 8:
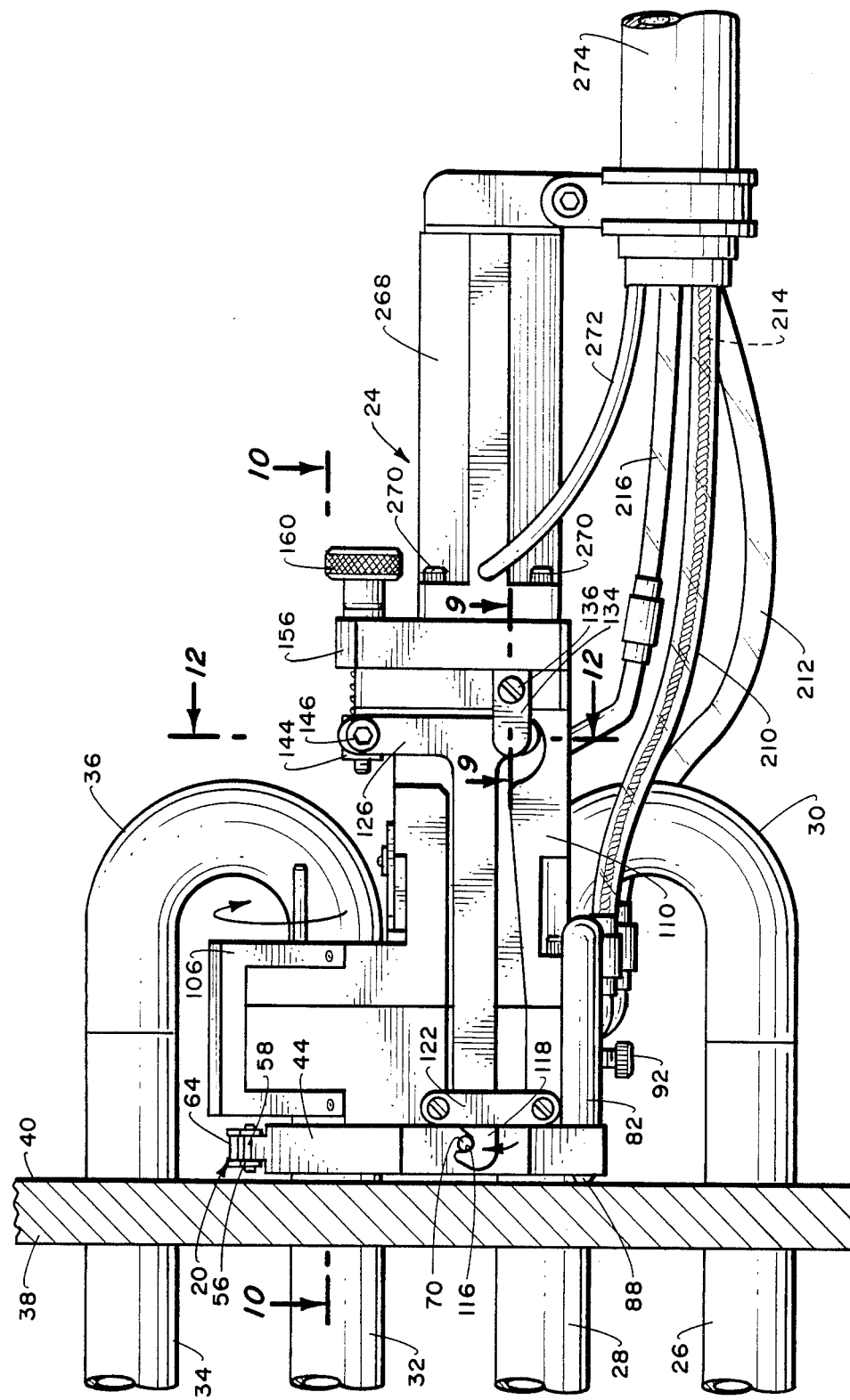
FIG. 8 is a view similar to FIG. 6 showing the weld head assembly in its fully installed position on the locator plate assembly.
Figure 10:
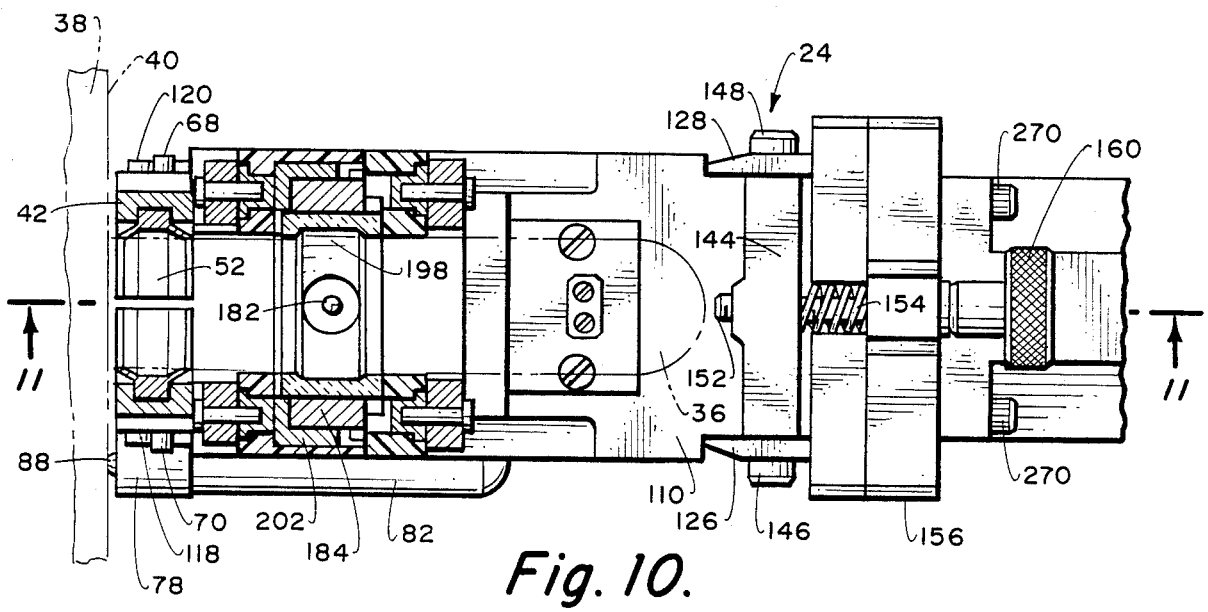
FIG. 10 is a top plan view, partly in cross-section, taken along 10—10 of FIG. 8.
Figure 11:
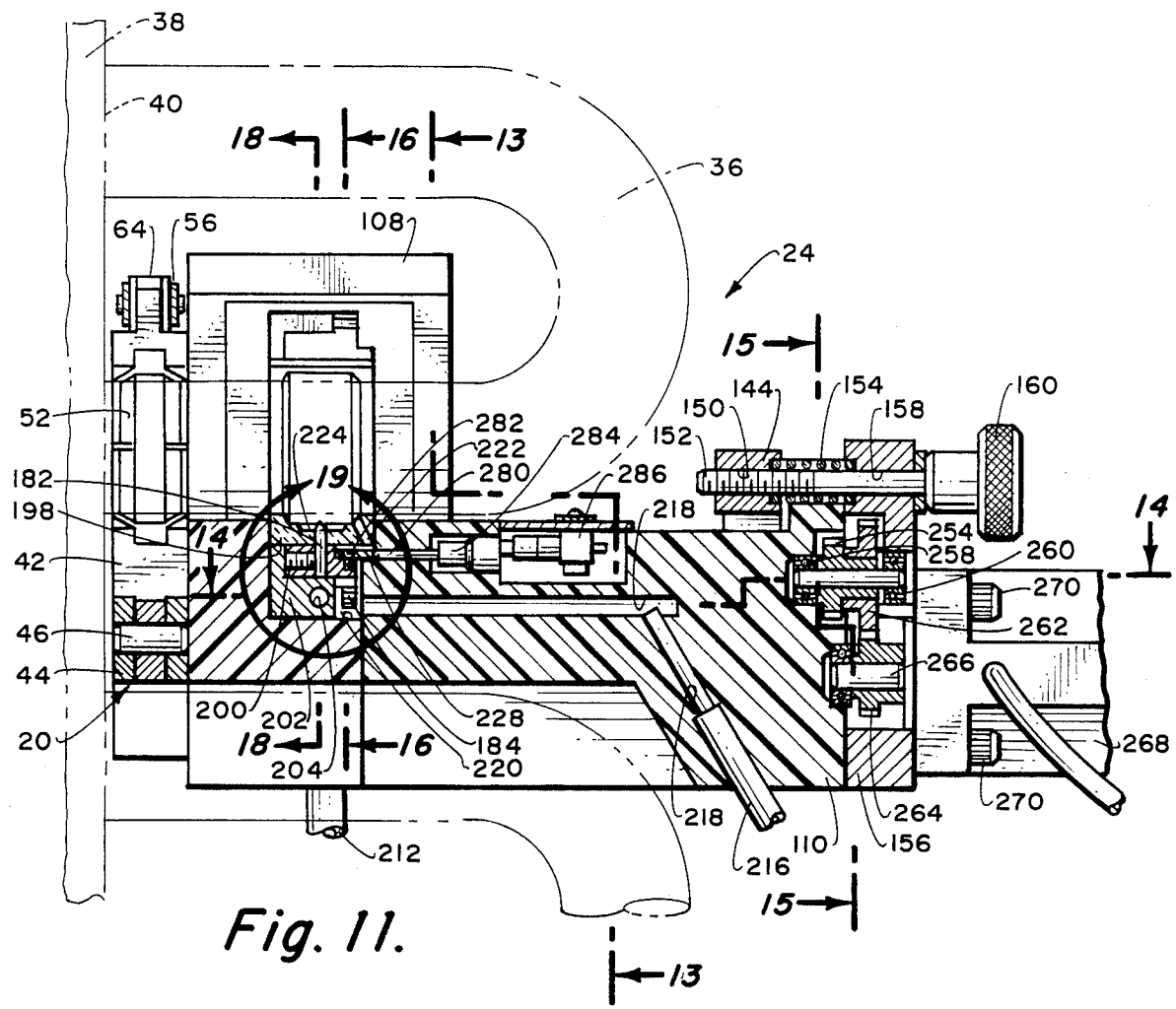
FIG. 11 is a cross-sectional view taken along line 11—11 of FIG. 10.
Figure 12:
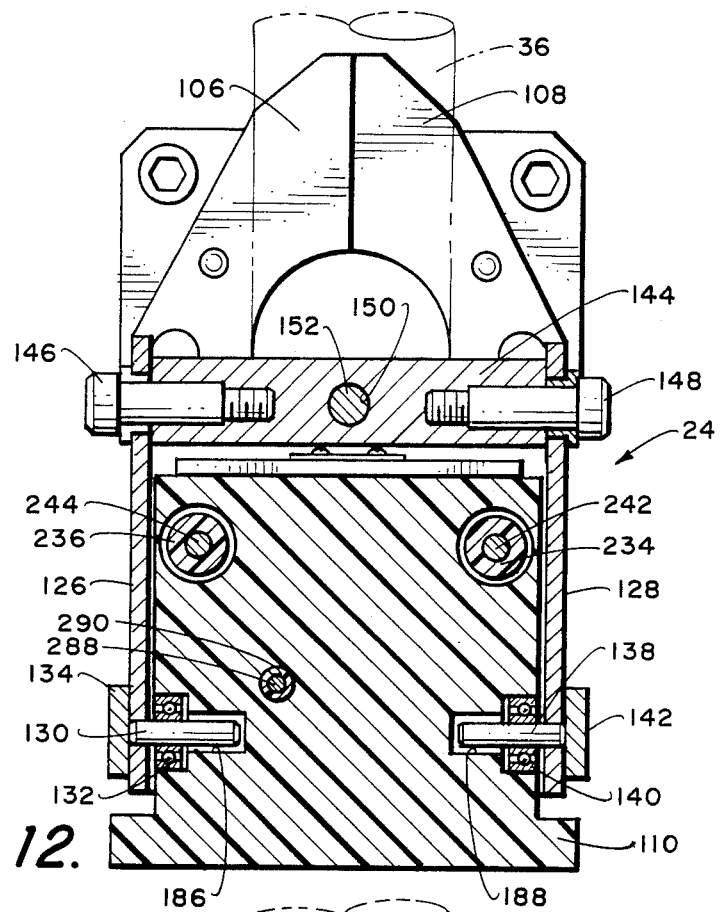
FIG. 12 is cross-sectional view through the welding head assembly included within this invention taken along line 12—12 of FIG. 8.
Figure 13:
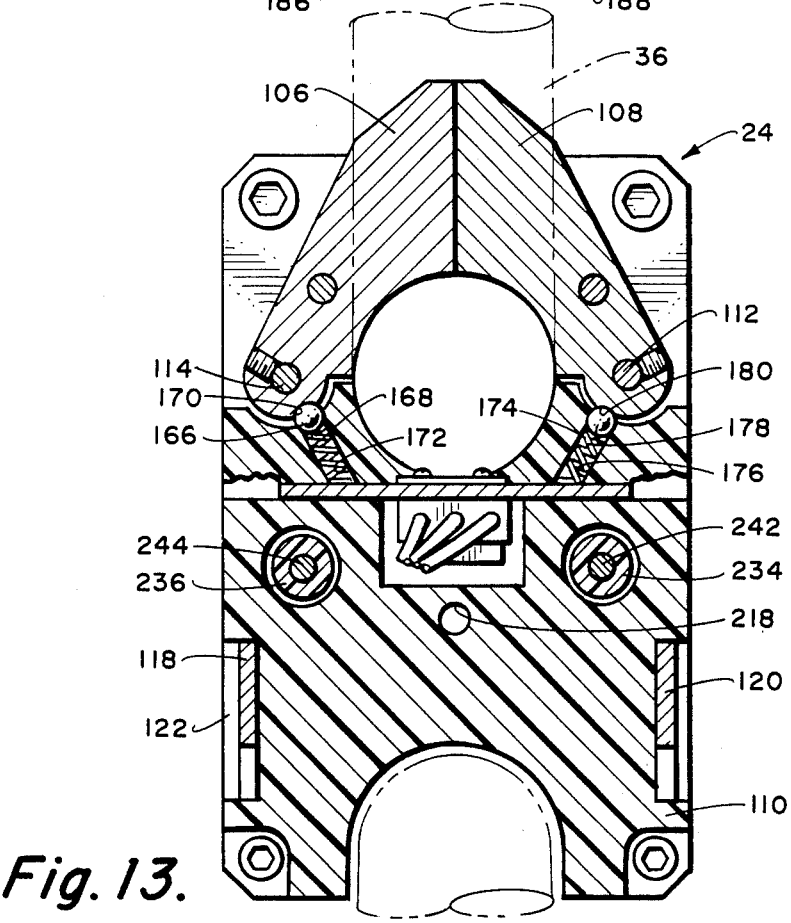
FIG. 13 is a cross-sectional view through the welding head assembly taken along 13—13 of FIG. 11.
Figure 14:
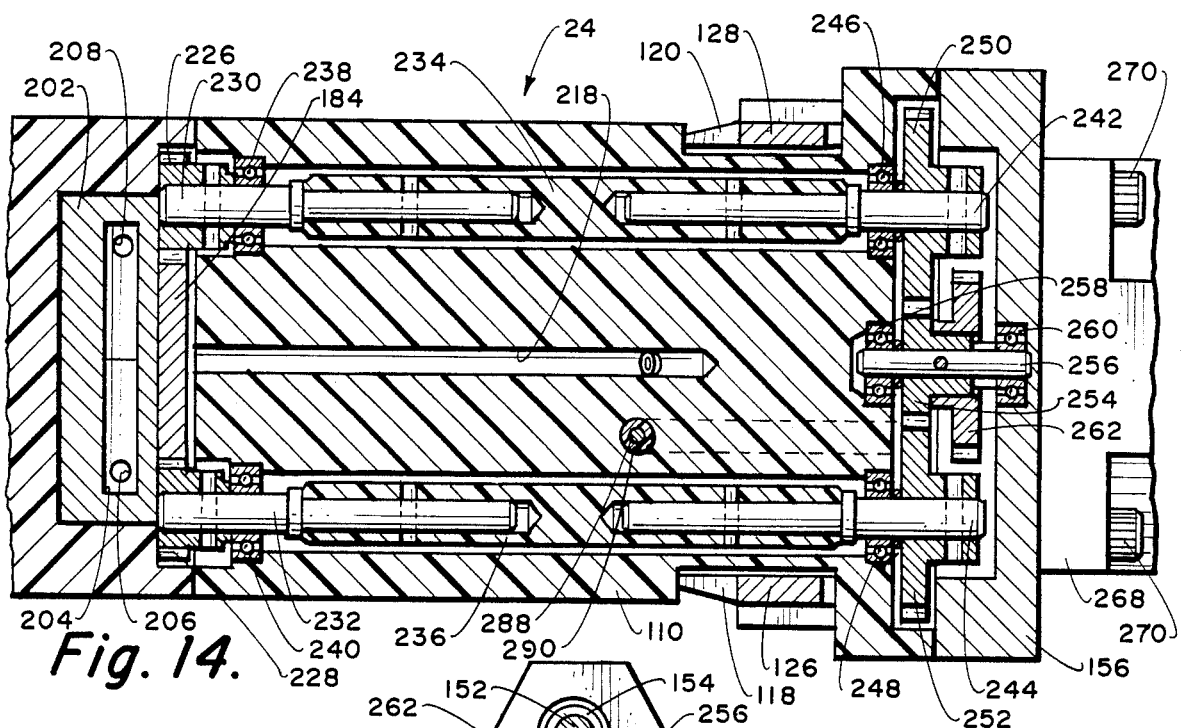
FIG. 14 is a cross-sectional view through the welding head assembly of the invention taken along line 14—14 of FIG. 11.
Figure 15:
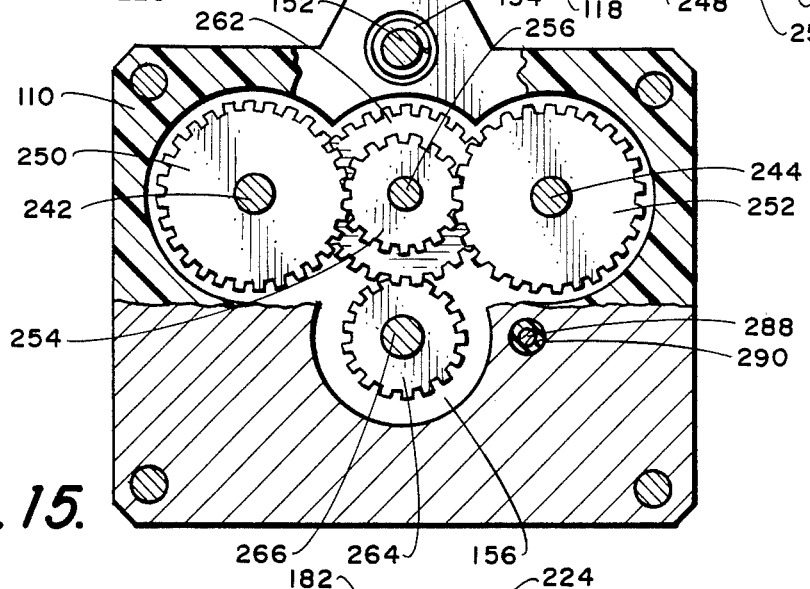
FIG. 15 is a cross-sectional view through the welding head assembly of this invention taken along line 15—15 of FIG. 11.
Figure 19:
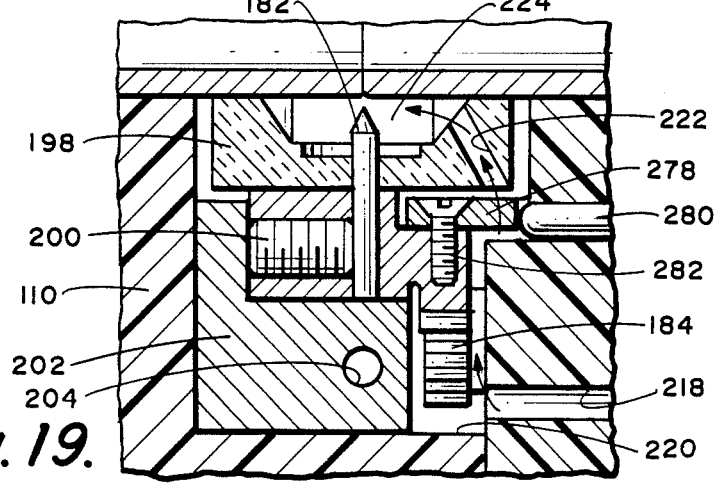
FIG. 19 is an enlarged, cross-sectional view taken along line 19—19 of FIG. 11 showing in more detail the welding electrode being mounted within the driven gear.
Figure 16:
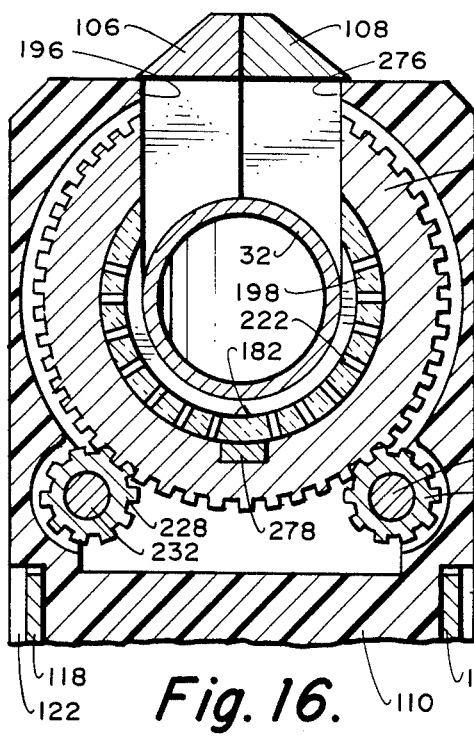
FIG. 16 is a cross-sectional view through the welding head of this invention taken along line 16—16 of FIG. 11 showing the driven gear which mounts the welding electrode in the position to facilitate connection to the tube to be welded.
Figure 17:
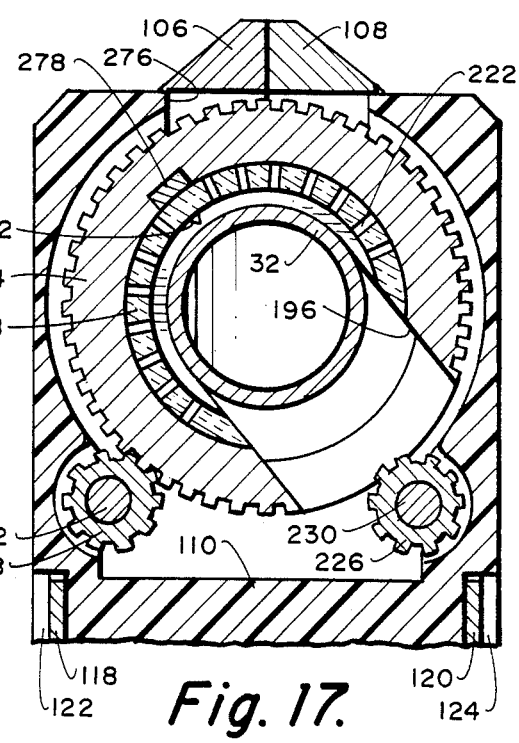
FIG. 17 is a view similar to FIG. 16 but showing the driven in an intermediate movement position during welding.
Figure 18:
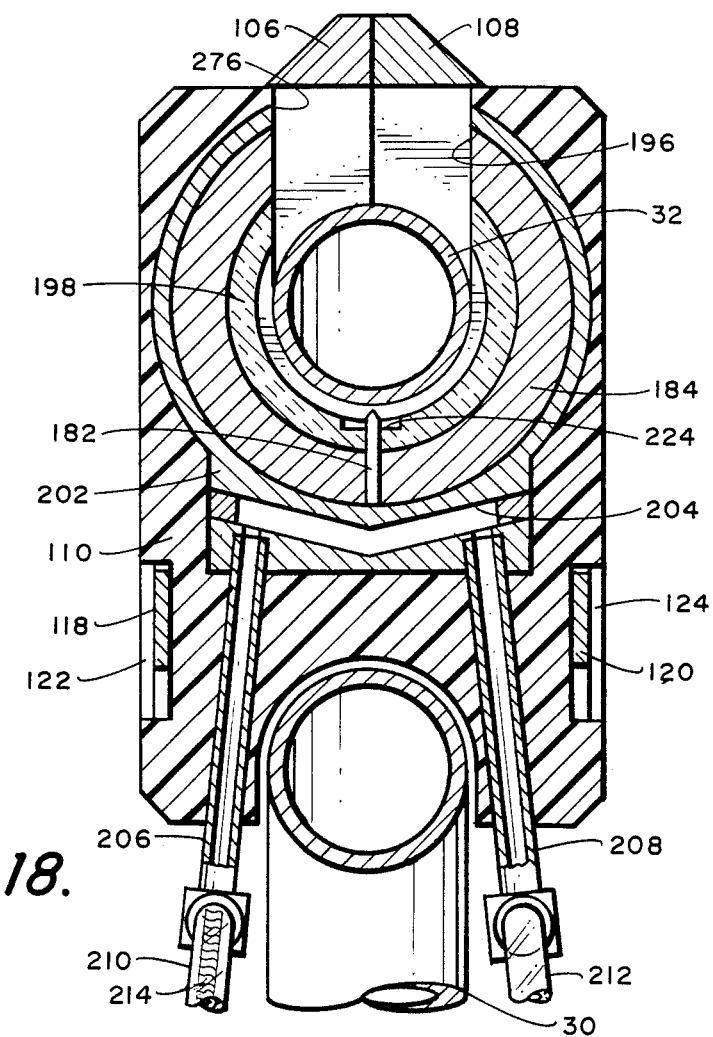
FIG. 18 is a cross-sectional view through the welding head apparatus taken along line 18—18 of FIG. 11.

It has been found that merely pivoting the bifurcated arm assembly about the pivot pins 130 and 138 is not sufficient travel to completely disengage the hook members 118 and 120 from their respective pins 70 and 68 and also when engaged, tightly secure together as an integral unit the locator plate assembly 20 and the welding head assembly 24. In order to achieve this slightly greater travel, the pins 130 and 138 are permitted to move lineally a limited distance. This limited distance is defined by the edges of oversized openings 186 and 188 with their respective pins 130 and 138. Initial movement of the connecting arms 126 and 128 from the vertical position shown in FIG. 8 is totally lineal until the pins 130 and 138 contact the forward edge of their respective openings 186 and 188. Continued loosening rotation of the threaded rod 52 causes counter-clockwise pivoting motion of the elongated hook members 118 and 120 so as to displace recesses, such as recess 116, below their respective pins 70 and 68, thereby permitting complete separation of the welding head assembly 24 from the locator plate assembly 20. It is to be noted that this lineal movement is assisted through the use of a pair of springs and pins which are in continuous contact with the pivot pins 130 and 138. Referring in particular to FIG. 9 there is shown such a spring 190 which is mounted within hole 192. The spring 190 is in continuous contact with the pin 194. The pin 194 is in continuous contact with the pivot pin 130. It is to be understood that there is a similar spring and pin arrangement associated with the pivot pin 138 which is not shown.

Located within the welding head housing 24 is a welding electrode 182. Welding electrode 182 is mounted within the driven gear 184. The driven gear 184 includes a gap 196. Welding electrode 192 protrudes through a gas cup 198 which is mounted within the driven gear 194. The welding electrode 182 is fixedly supported within the driven gear 184 by means of a set screw 200.

A portion of the driven gear 184 is smoothly contoured and rests within a cooling block 202. Cooling block 202 includes a cooling passage 204. Cooling water is to be supplied through cooling conduit 206 to the cooling passage 204. Cooling conduit 206 is mounted within the housing 110. After conducting of the cooling water through the passage 204, it is discharged through conduit 208 which is also mounted within the housing 110. Water is conducted through the conduit 206 through transparent hose 210. Transparent hose 212 connects with conduit 208. It is to be understood that the hoses 210 and 212 will be connected to an appropriate source of cooling liquid (not shown). The function of the cooling liquid is to dissipate some of the excess heat that is produced during the welding operation.

The welding current is supplied from a source (not shown) through a conducting cable 214. The electrical current from the cable 214 is conducted through the conduit 206 to the cooling lock 202. From the cooling block, the electrical current is transmitted through the driven gear 184 to the electrode 182. In order to complete the electrical circuit path there is an appropriate electrical ground connected to the welding electrode 182.

Inert gas is to be supplied to the welding area through hose 216 from a source (not shown). The hose 216 is connected to a passage 218 formed within the housing 110. From the passage 218 gas is conducted into chamber 220 formed within the housing 110. From chamber 220 the gas is conducted into holes 222 formed within the gas cup 198. From the holes 222 the inert gas is discharged into chamber 224 which surrounds the tip of the welding electrode 182. The use of an inert gas in welding is quite common. The gas is discharged from the chamber 224 into the ambient through gap 196.

Rotation of the driven gear 184 is caused by spaced apart driving gears 226 and 228. The two separate gears 226 and 228 are utilized so that there will be always at least one gear in contact with the driven gear 184 as the gap 196 moves past one of the gears 226 or 228.

The gear 226 is mounted on a shaft 230. The gear 228 is mounted on a shaft 232. The shaft 230 is located within a sleeve 234. The shaft 232 is mounted within a similar sleeve 236. Shaft 230 is rotatively supported by a bearing assembly 238 within the housing 110. A similar bearing assembly 240 supports the shaft 232 with respect to the housing 110.

Connecting with the sleeve 234 is a separate shaft 242. A similar shaft 244 connects with the sleeve 236. Shaft 242 is low frictionally mounted by means of a bearing assembly 246 within the housing 110. A similar bearing assembly 248 low frictionally supports the shaft 244 within the housing 110.

Mounted on the shaft 242 is a pinion gear 250. A similar pinion gear 252 is mounted on the shaft 244. Connecting with both pinion gears 250 and 252 is an idler gear 254. The idler gear 254 is mounted on a shaft 256, the shaft 256 is mounted between bearing assemblies 258 and 260 which are in turn mounted within the housing 110.

The idler gear 254 is connected to a driving gear 262. The driving gear 262 is connected to motor gear 264. Motor gear 264 is mounted on motor shaft 266. The motor shaft connects from a motor (not shown) which is mounted within motor housing 268. Motor housing 268 is mounted by bolts 270 to the motor mounting plate 156. Operation of the motor within the motor housing 268 is accomplished electrically through electrical conductor 272 from a source of electricity (not shown). For convenience reasons the conductor 272 as well as hoses 210, 212 and 216 are all confined within hose 274.

Upon operation of the motor the shaft 266 is rotated. This causes the gear 264 to rotate, which in turn rotates gear 262. Rotation of gear 262 rotates gear 254. Rotation of gear 254 causes rotation of gears 250 and 252 in the same rotational direction. This direct rotational direction is transmitted directly to gears 226 and 228 which results in rotational movement of the driven gear 184 which causes the welding electrode 182 to circumferentially move about the tube 32 and produce the desired welding between the tubes 32 and 36.

It is desired that the welding procedure produce a complete weld bead exactly 360°. In order to obtain this, it is necessary that there occur a slight overlap in the welding. In other words the driven gear 184 must be driven more than 360°, while the electrode 182 is welding. The welding operation is preset to occur a desired number of degrees greater than 360°, such as 370 or 380 degrees or whatever is desired. However, after the welding procedure is terminated, an electrical current is no longer transmitted to the welding electrode 182, it is necessary to continue to rotate the driven gear 184 so that the gap 196 aligns with the opening 276 formed within the housing 110. Therefore, the motor within the motor housing 268 continues to rotate the driven gear 184.

Shutting down of the motor is to occur at the precise moment upon protuberance 278 coming into contact with pin 280. Protuberance 278 is fixedly mounted by fastener 282 on driven gear 184. The protuberance 278 moves the pin 280 longitudinally. This longitudinal movement of the pin 280 acts against spring loaded actuator 284. The actuator 284 operates against switch assembly 286. The electrical switch assembly 286 is such that every other time that the actuator 284 is moved, the switch assembly 286 will deactivate the motor located within the motor housing 268. The reason for this is, upon starting of the rotation of the driven gear 184, the pin 280 is moved. After 360° rotation, the pin 280 is moved again, and at this particular time the motor is not shut down. The reason for this as previously mentioned is so that welding will occur past 360°.

However, at the next cycle when the pin 280 is moved by the protuberance 278, the switch assembly 286 causes deactivation of the motor stopping the gap 196 in precise alignment with the opening 276. Therefore, upon opening movement of the clam shell members 106 and 108, the now welded tube 32 and 36 can be readily passed through the aligned openings 196 and 276 to facilitate movement of the welding head assembly 24 to another tube to repeat the welding procedure.

The switch assembly 286 is connected through an electrical conductor assembly 288 to the motor. The electrical connector 286 passes through passage 290 formed within the housing 110.

What is claimed is:

1. A welding head assembly for welding a first section of cylindrical tubing to a second section of cylindrical tubing, the first section protrudes from a tube sheet, said welding head assembly comprising:
   a locator plate assembly to be fixedly mounted by fixing means on the first section, said locator plate assembly being removable;
   a location gage assembly to be connected to said locator plate assembly, said location gage assembly including alignment means, said alignment means to be alignable with the end of the first section to thereby position said locator plate assembly prior to being fixed to the first section, said location gage assembly to be removable from said locator plate assembly; and
   a weld head removably connected by connection means to said locator plate assembly, said welding head to be operable to weld the first section to the second section.

2. The welding head assembly as defined in claim 1 wherein:
   said locator plate assembly includes a position locator mechanism, said position locator mechanism to be adjusted to space said locator plate assembly a predetermined distance from the tube sheet.

3. The welding head assembly as defined in claim 2 wherein:
   said position locator mechanism including a spring biased rod assembly, said rod assembly being continuosly biased towards the tube sheet.

4. The welding head assembly as defined in claim 1 wherein:
   said connection means comprising a bifurcated hook assembly, said bifurcated hook assembly being movable between a disengagable position and an engagable position, with said bifurcated hook assembly in said engagable position said welding head being fixedly secured to said locator assembly.

5. The welding head assembly as defined in claim 1 wherein:
   said welding head including a welding electrode, said welding electrode being supported by a driven gear, said driven gear having a peripheral edge, said peripheral edge including a protuberance, said protuberance to connect with a switch assembly to stop movement of said driven gear at a predetermined location.

6. The welding head assembly as defined in claim 1 wherein:
   said welding head including a pair of movable clam shell members, said clam shell members being movable between an open position and a closed position, said closed position being when said clam shell members are located about the welding area forming an enclosing chamber about said welding area.

7. The welding assembly as defined in claim 6 wherein:
   said connection means comprising a bifurcated hook assembly, said bifurcated hook assembly being movable between a disengagable position and an engagable position, with said bifurcated hook assembly in said engagable position said welding head being fixedly secured to said locator assembly.

8. The welding head assembly as defined in claim 7 wherein:
   said welding head including a welding electrode, said welding electrode being supported by a driven gear, said driven gear having a peripheral edge, said peripheral edge including a protuberance, said protuberance to connect with a switch assembly to stop movement of said driven gear at a predetermined location.

9. The welding head assembly as defined in claim 8 wherein:
   said locator plate assembly includes a position locator mechanism, said position locator mechanism to be adjusted to space said locator plate assembly a predetermined distance from the tube sheet.

10. The welding head assembly as defined in claim 9 wherein:
    said position locator mechanism including a spring biased rod assembly, said rod assembly being continuously biased towards the tube sheet.

11. A welding head assembly for welding a first section of cylindrical tubing to a second section of cylindrical tubing, the first section protrudes from a tube sheet, said welding head assembly comprising:
    a locator plate assembly to be fixedly mounted by fixing means on the exterior surface of the first section, said locator plate assembly being removable; and
    a welding head removably connected by connection means to said locator plate assembly, said welding head to be operable to weld the first section to the second section.

12. A welding head assembly for welding a first section of cylindrical tubing to a second section of cylindrical tubing, the first section protrudes from a tube sheet, said welding head assembly comprising:
    a locator plate assembly to be fixedly mounted by fixing means on the first, said locator plate assembly being removable;
    a welding head removably connected by connection means to said locator plate assembly, said welding head to be operable to weld the first section to the second section; and
    said connection means comprising a bifurcated hook assembly, said bifurcated hook assembly being movable between a disengagable position and an engagable position said bifurcated hook assembly in said engagable position said welding head being fixedly secured to said locator assembly.

13. A welding head assembly for welding a first section of cylindrical tubing to a second section of cylindrical tubing, the first section protrudes from a tube sheet, said welding head assembly comprising:
    a locator plate assembly to be fixedly mounted by fixing means on the first section, said locator plate assembly being removable;

a welding head removably connected by connection means to said locator plate assembly, said welding head to be operable to weld the first section to the second section; and said welding head including a welding electrode, said welding electrode being supported by a driven gear, said driven gear having a peripheral edge, said peripheral edge including a protuberance, said protuberance to connect with a switch assembly to stop movement of said driven gear at a predetermined location.

14. A welding head assembly for welding a first section of cylindrical tubing to a second section of cylindrical tubing, the first section protrudes from a tube sheet, said welding head assembly comprising:

a locator plate assembly to be fixedly mounted by fixing means on the first section, said locator plate assembly being removable;

a welding head removably connected by connection means to said locator plate assembly, said welding head to be operable to weld the first section to the second section; and said welding head including a pair of movable clam shell members, said clam shell members being movable between an open position and a closed position, said closed position being when said clam shell members are located about the welding area forming an enclosing chamber about said welding area.

15. A welding head assembly for welding a first section of cylindrical tubing to a second section of cylindrical tubing, the first section protrudes from a tube sheet, said welding head assembly comprising:

a locator plate assembly to be fixedly mounted by fixing means on the first section, said locator plate assembly being removable;

a welding head removably connected by connection means to said locator plate assembly, said welding head to be operable to weld the first section to the second section; and said locator plate assembly includes a position locator mechanism, said position locator mechanism to be adjustable by adjustment means to a desired spacing of said locator plate assembly from the tube sheet, said position locator mechanism being fixed at said desired spacing and, upon moving of said position locator mechanism to a new location, said position locator mechanism will be located again at said desired spacing from the tube sheet.

16. A welding head assembly for welding a first section of cylindrical tubing to a second section of cylindrical tubing, the first section protrudes from a tube sheet, said welding head assembly comprising:

a locator plate assembly to be fixedly mounted by fixing means on the first section, said locator plate assembly being removable;

a welding head removably connected by connection means to said locator plate assembly, said welding head to be operable to weld the first section to the second section;

said locator plate assembly includes a position locator mechanism, said position locator mechanism to be adjusted to space said locator plate assembly a predetermined distance from the tube sheet; and said position locator mechanism including spring biased rod assembly, said rod assembly being continuously biased towards the tube sheet.

17. The welding head assembly as defined in claim 16 wherein:

said connection means comprising a bifurcated hook assembly, said bifurcated hook assembly being movable between a disengagable position and an engagable position, with said bifurcated hook assembly in said engagable position said welding head being fixedly secured to said locator assembly.

18. The welding head assembly as defined in claim 17 wherein:

said welding head including a welding electrode, said welding electrode being supported by a driven gear, said driven gear having a peripheral edge, said peripheral edge including a protuberance, said protuberance to connect with a switch assembly to stop movement of said driven gear at a predetermined location.

19. The welding head assembly as defined in claim 18 wherein:

said welding head including a pair of movable clam shell members, said clam shell members being movable between an open position and a closed position, said closed position being when said clam shell members are located about the welding area forming an enclosing chamber about said welding area.

* * * * *